United States Patent
Krishna et al.

(10) Patent No.: US 11,822,551 B2
(45) Date of Patent: *Nov. 21, 2023

(54) PRE-OPTIMIZED WRITES TO A DATABASE BASED ON INTELLIGENCE GATHERED FROM READ CACHE

(71) Applicant: International Business Machines Corporation, Armonk, NY (US)

(72) Inventors: Hariharan Krishna, Bangalore (IN); Shajeer K Mohammed, Bangalore (IN); Sudheesh S. Kairali, Kozhikode (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/462,288

(22) Filed: Aug. 31, 2021

(65) Prior Publication Data
US 2023/0062388 A1    Mar. 2, 2023

(51) Int. Cl.
  *G06F 16/2455* (2019.01)
  *G06F 16/27* (2019.01)
  *G06F 16/23* (2019.01)
  *G06F 16/215* (2019.01)

(52) U.S. Cl.
  CPC ...... *G06F 16/24552* (2019.01); *G06F 16/215* (2019.01); *G06F 16/2379* (2019.01); *G06F 16/27* (2019.01)

(58) Field of Classification Search
  None
  See application file for complete search history.

(56) References Cited

U.S. PATENT DOCUMENTS

| | | | |
|---|---|---|---|
| 9,208,207 B2 | 12/2015 | Venkataramani | |
| 10,013,501 B2 | 7/2018 | Sundaravaradan | |
| 10,216,820 B1* | 2/2019 | Holenstein | G06F 3/065 |
| 10,642,727 B1* | 5/2020 | Volpe | G06F 12/0238 |
| 2006/0020752 A1* | 1/2006 | Schnapp | G06F 12/0804 |
| | | | 711/143 |
| 2013/0275685 A1 | 10/2013 | Barbas | |

(Continued)

FOREIGN PATENT DOCUMENTS

CN    105956166 B    2/2020

OTHER PUBLICATIONS

Anonymously, "Method to Provide Read Committed Isolation for Multi Version Concurrency Control Column Store Database," IP.com No. IPCOM000261079D, Jan. 2020, 11 pages.

(Continued)

*Primary Examiner* — Richard L Bowen
(74) *Attorney, Agent, or Firm* — Van Leeuwen & Van Leeuwen; Matthew C. Zehrer

(57) ABSTRACT

An approach is provided that receives a request to write an entry to a database. Database caches are then checked for a portion of the entry, such as a portion that includes a primary key. Based on the checking, the approach determines whether to write the entry to the database. In response to the determination being that the entry cannot be written to the database, an error is returned with the error being returned without accessing the database, only the caches. On the other hand, the entry is written to the database in response to the determination being that the entry can be written to the database.

17 Claims, 6 Drawing Sheets

(56) References Cited

U.S. PATENT DOCUMENTS

| | | | | |
|---|---|---|---|---|
| 2013/0326536 A1* | 12/2013 | Connor | ............... | G06F 11/0715 |
| | | | | 718/106 |
| 2014/0324785 A1* | 10/2014 | Gupta | ................. | G06F 16/2358 |
| | | | | 707/689 |
| 2016/0179687 A1* | 6/2016 | Kumar | ................ | G06F 12/0895 |
| | | | | 711/135 |
| 2018/0150397 A1 | 5/2018 | Gupta | | |
| 2019/0129894 A1* | 5/2019 | Peng | ........................ | G06F 12/08 |
| 2019/0227937 A1 | 7/2019 | Ramamurthy | | |
| 2019/0303462 A1* | 10/2019 | Brown | ..................... | G06F 16/25 |
| 2020/0257676 A1* | 8/2020 | Zhang | ..................... | G06F 9/466 |
| 2020/0379952 A1* | 12/2020 | Wang | ..................... | G06F 16/178 |
| 2021/0034477 A1 | 2/2021 | Pederson | | |
| 2021/0089452 A1 | 3/2021 | Peng | | |
| 2022/0292032 A1* | 9/2022 | Krishna | .............. | G06F 12/0238 |

OTHER PUBLICATIONS

Sarkar et al., "Efficient Cooperative Caching using Hints," USENIX Association Second Symposium on Operating Systems Design and Implementation (OSDI '96), Oct. 1996, Seattle, WA, USA, pp. 35-46.

International Search Report and Written Opinion of the International Searching Authority for International Application No. PCT/EP2022/073348, dated Nov. 14, 2022, 12 pages.

\* cited by examiner

PRE-OPTIMIZED WRITES TO A DATABASE BASED ON INTELLIGENCE GATHERED FROM READ CACHE

BACKGROUND

Large-scale data has brought challenges in the aspects of efficient storage and access requirements in database technologies. Caching strategies have impacts on system design and the resulted performance. Caching data can improve query performance by storing the data locally instead of accessing the data directly from the data source. A database cache supplements the primary database by reducing unnecessary pressure on it, traditionally in the form of frequently accessed read data when a requestor is wanting to read data from the database.

SUMMARY

An approach is provided that receives a request to write an entry to a database. Database caches are then checked for a portion of the entry, such as a portion that includes a primary key. Based on the checking, the approach determines whether to write the entry to the database. In response to the determination being that the entry cannot be written to the database, an error is returned with the error being returned without accessing the database, only the caches. On the other hand, the entry is written to the database in response to the determination being that the entry can be written to the database.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein.

DETAILED DESCRIPTION

Figure 1:
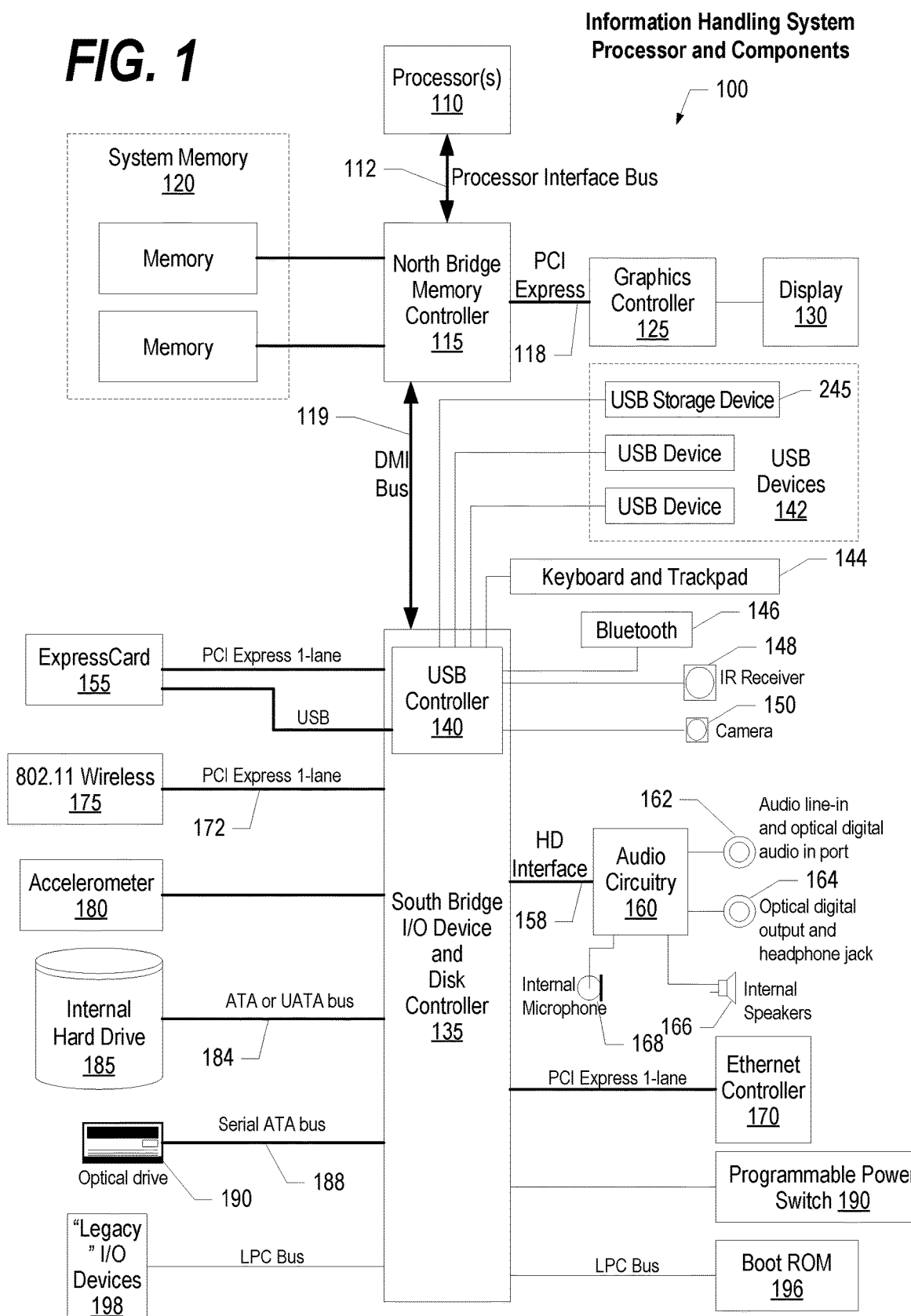
FIG. 1 is a block diagram of a data processing system in which the methods described herein can be implemented.

FIGS. 1-6 show an approach that pre-optimizes database write operations based on data available in one or more caches. Whenever a read operation carried out, in traditional database implementation strategies, a cache is populated which is generally called the "read" cache. The approach uses data from this cache for optimizing write operations. The approach builds an intelligent cache graph builder (ICGB) component that uses the existing database caching to determine and automatically evaluate a requested database write operation (incoming insert/update request). The evaluation is based on data found in relevant caches. If a write operation is found to be invalid, the request can be discarded without actually accessing the database.

The methodology of this approach addresses repetitive or irrelevant data inserts/updates and pre-emptively discards invalid requests instead of processing them. For example, before an insert statement, the approach performs a check to determine whether the primary key (main identifier) already exists. If it already exists, the approach returns an error without actually accessing the database and without trying to perform such an insert on the actual database.

In one embodiment, the Intelligent Cache Graph Builder component (ICGB) is essentially an addition to existing L1, L2 and L3 caching technologies that formulates all the existing cache hits into a readable and understandable graph of object at tenant level. This data is further granulated into an in-memory block of information, which is self-built based on the number of accesses, and used for further analysis of incoming write operations. In this manner, the approach uses intelligence gathered during a lower grant level operation, such as read operations, in order to optimize a larger grant (or more privileged) operation such as write operation.

In a traditional database management system (DBMS), a user accessing the application involves DB traverse, this includes multiple accesses to DB tables, these access which are typically 'read' in nature are used for building an extensive ICGP based graph infrastructure, this information is further used for processing the write statements. The ICGB is not only built during the read access, it is also is enriched using the write operations. If a database write is being called from end user, the success or failure of this write (insert/update) is also captured in the ICGB and this information is used for future write operations (inserts/updates).

The following example illustrates a possible use case where the approach described herein is advantageously utilized in a DBMS. In this example (1) An existing user requests to login into an application. The login request is processed to check the database to ascertain whether the user identifier exists (e.g., user ID=UID1000). (2) Once the password is validated, the user is allowed to access the site. (3) The read cache is updated (created) with a new graph entry that states that User table has a user identifier of UID1000. (4) A new user registration request comes where in user tries to create a new user identifier of UID1000. The existing user table graph is used (from the read cache) and an error is thrown that a user with identifier UID1000 already exists in the database table. This error occurs without ever accessing the actual database, without even using an SQL "select" statement. Similarly, non-SQL databases can also use this approach (e.g., checking for an existing JSON entry, etc.) to use read caches and preemptively optimize write operations (e.g., update or insert, etc.).

In the process of discarding a write operation, such as an insert, the approach implicitly avoids a cache insert which further might have resulted in a database access. In one embodiment, there is a distributed read cache between various replicas of a replicated database. This could be implemented as an integral part of the DB or as an external service.

When an external entity attempts to read data from the database and the operation is successful, the metadata about the data (e.g., primary keys, indexes, etc.) that allows the system to check for duplicity of data will be stored in the cache. In a distributed database environment, various read caches of the various replicas may be synchronized. In this manner, even if one replica has not read anything yet will still have acquired knowledge about all the successful searches that occurred at other replicas.

In this approach, delete operations are also handled. On a successful delete, the read, write and discard cache entries for the deleted entry are removed and, in a distributed environment, the various replicas will sync the caches. When an external entity tries to delete or remove an entry from the database and, when the operation is successful, the read, discard and write caches are updated to remove the corresponding entries to the entry that was deleted.

The approach is based on the following novel ideas. The write operation identifies the possibility of discard-ability of the data in an early stage. It checks all caches which have been updated by dissimilar operations, such as read cache. If the read cache has a similar entry as the one that the user is trying to create, the system will not try to write this entry to the database, instead the approach rejects the operation at this early stage without ever accessing the database. In a distributed database environment, since all read cache replicas are in kept sync, even a relatively new replica will acquire intelligence quickly from the other replicas.

If read cache misses a hit, then the system searches the discard cache. The discard cache is updated with all the DISCARDED or REJECTED writes by the system in a recent time period. If the system finds matching data in the discard cache, then the system performs a preemptive instead of searching in the bulkier WRITE CACHE and instead of searching for the data in the actual database. If the read discard caches both miss the hit, the approach searches the write cache which will include all write entries and, if this also misses, then system will access the actual database. In one embodiment, the approach also includes a CUSTOM CACHE that system administrators can update either manually or programmatically to influence the intelligent reject process.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 2:
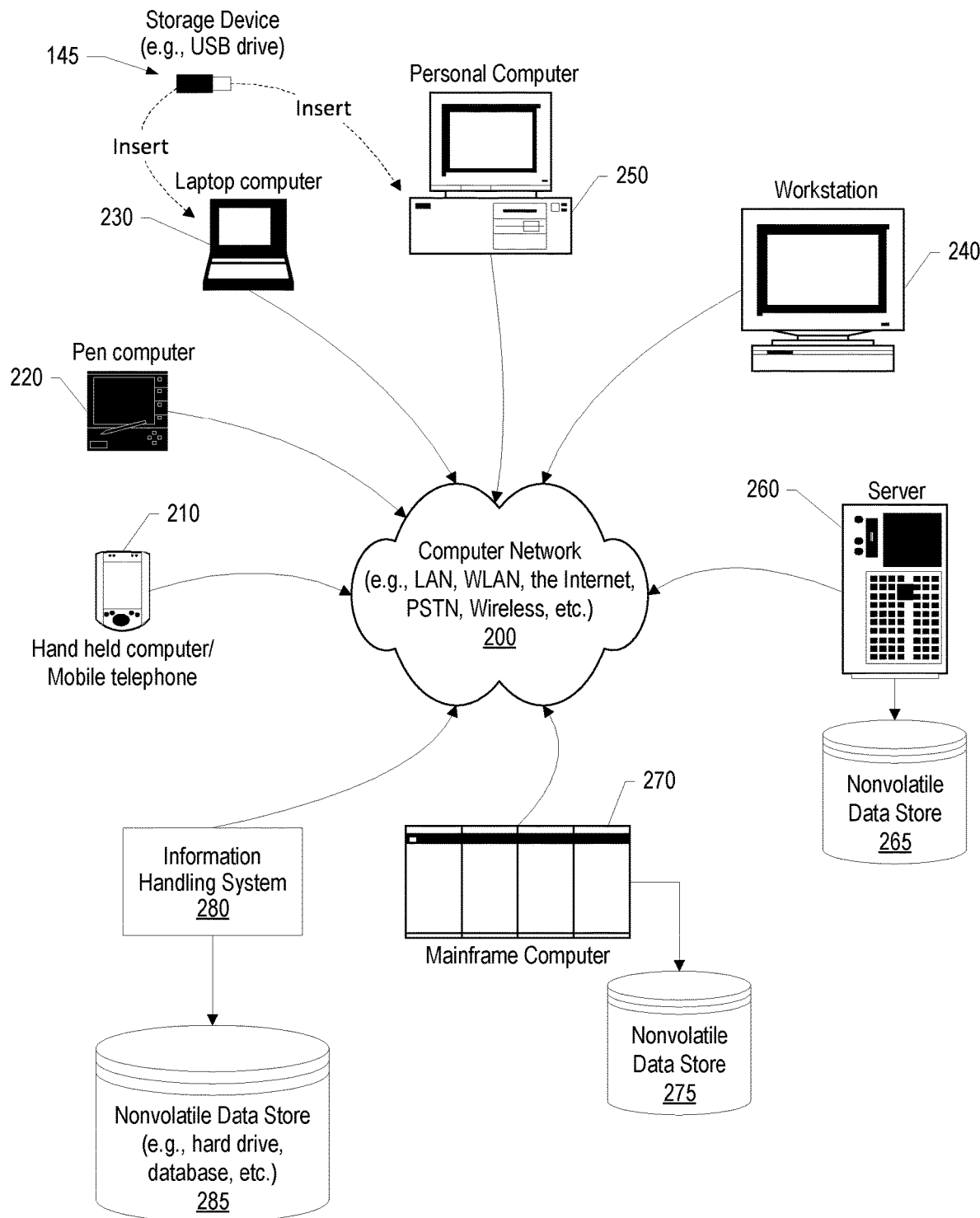
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a device that is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Accelerometer 180 connects to Southbridge 135 and measures the acceleration, or movement, of the device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may be a device that can take many forms. For example, an information handling system may take the form of a desktop device, server device, portable device, laptop device, notebook device, or other form factor device. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of devices that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling system devices include pen, or tablet, device 220, laptop, or notebook, device 230, workstation device 240, personal computer system device 250, and server device 260. Other types of information handling system devices that are not individually shown in FIG. 2 are represented by information handling system device 280. As shown, the various information handling system devices can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
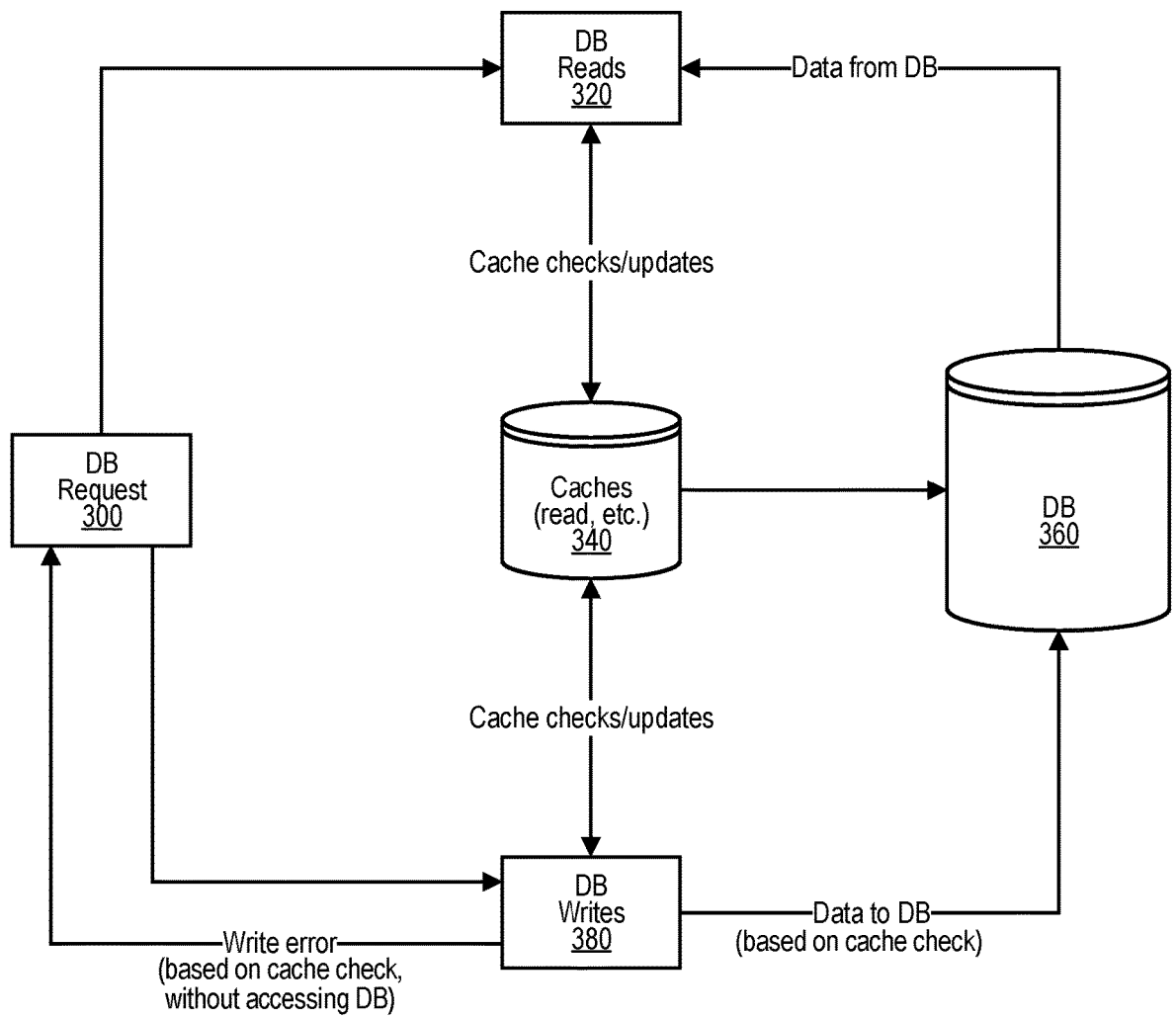
FIG. 3 is a diagram depicting writes to a database being analyzed and some errors being rejected without accessing the actual database.

FIG. 3 is a diagram depicting writes to a database being analyzed and some errors being rejected without accessing the actual database. For simplicity, only database read and write operations are depicted. Database requestor 300 submits a request to retrieve or update data from/to database 360. Database read requests are handled by database read operation 320 which retrieves data from database 360 when the information is not more readily available from one or more database caches 340. Database read operation 320 checks caches 340 (e.g., database read cache, etc.) for the database entry that is being requested. If the entry is found in the cache, the entry is returned to requestor 300 without having to actually access database 360. If the requested entry is not found in caches 340, then the database read operation retrieves the requested data from database 360 and updates caches 340 with the retrieved entry data. Updating the caches provides for faster access from the cache rather than the database if a subsequent request is received for the same entry.

Database write requests (updates and inserts) are handled by database write operation 380. Database write operation also checks caches 340 to determine whether the entry already exists in the database. If the entry already exists, an update operation can proceed, however an insert operation returns an error. In this case, the error on the insert operation is returned to requestor 300 without every having to actually access database 360. Likewise, if the entry does not exist in the database (e.g., was previously deleted, etc.), an insert operation can proceed, however an update operation causes an error to be returned to requestor 300 because there is no entry in the database to be updated. Again, this error is returned to the requestor without ever having to actually access database 360.

Figure 4:
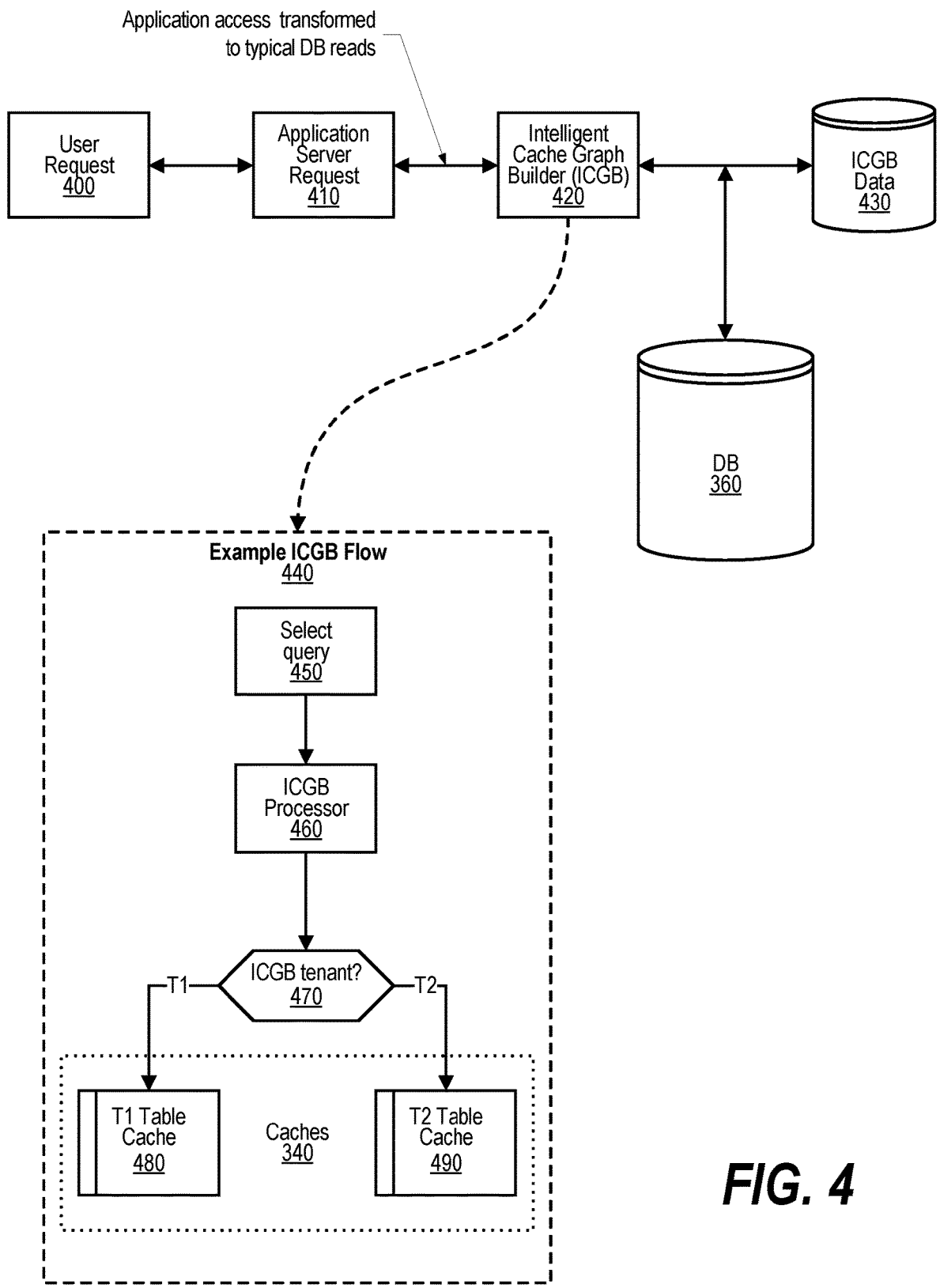
FIG. 4 is a diagram showing an intelligent cache graph builder being built based on data in various database caches.

FIG. 4 is a diagram showing an intelligent cache graph builder (ICGB) being built based on data in various database caches. The ICGB is essentially an intelligent combination of various caches so that the ICGB cache can be checked for write operations (inserts and updates) rather than having to check multiple caches. At 400, the process receives a user request. At 410, the user request is formed into an application server request. Application access is transformed to typical database access requests (e.g., database reads, etc.). The Intelligent Cache Graph Builder (ICGB) operates at 420 with the process checking and updating ICGB data store 430 for data pertaining to the request and, when needed, accessing database 360 to read, write, and delete data in the database. ICGB data includes caching data from accessing database 360 with the caching data being intelligently combined into ICGB data 430 that can be individually checked rather than checking multiple caches. An example ICGB flow is shown in box 440. At step 450, the process receives a select query that is transmitted to ICGB processor 460. At decision 470, the ICGB process determines the type of ICGBs tenant for updating caches 340. If the tenant is a T1 cache entry, then decision 470 branches to the 'T1' branch and updates T1 cache 480. On the other hand, if the tenant is a T2 cache entry, then decision 470 branches to the 'T2' branch and updates T2 cache 490.

Figure 5:
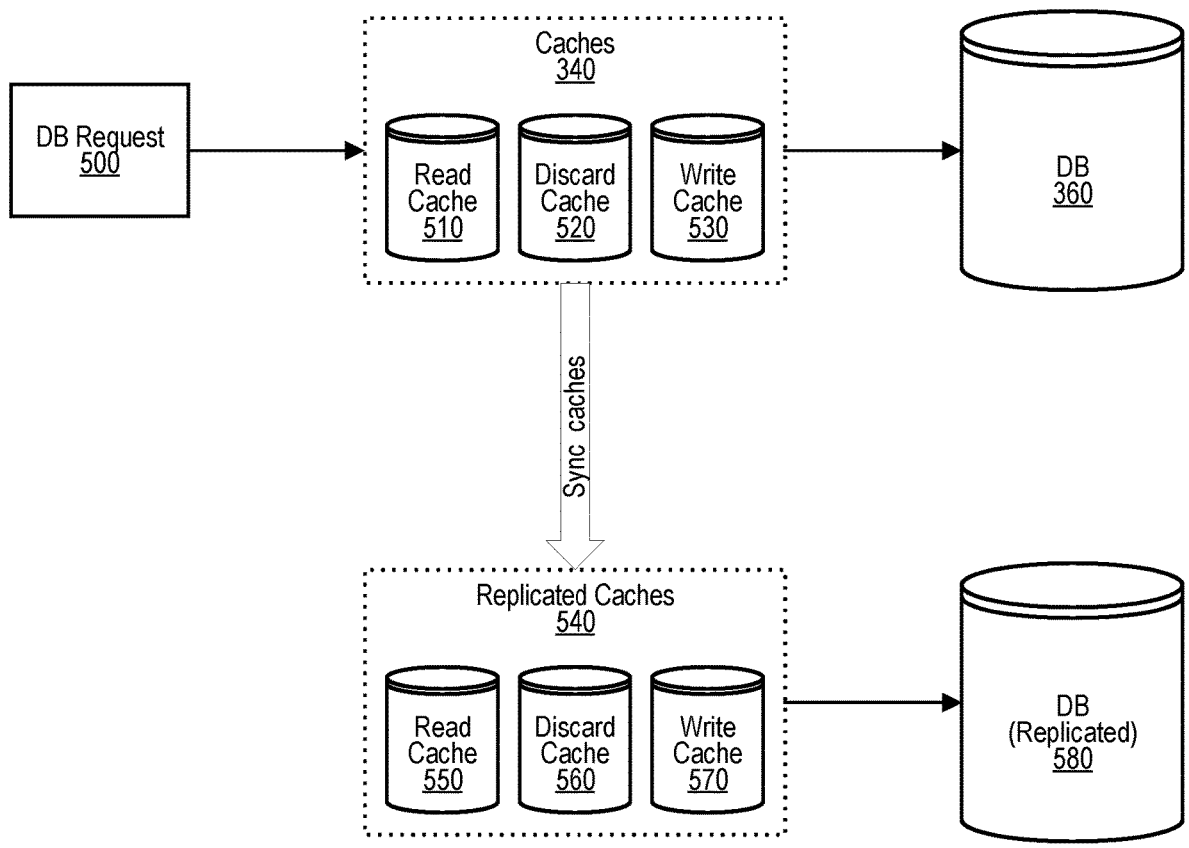
FIG. 5 is a diagram showing pre-optimized writes to a database based on intelligence gathered from a cache operating on a replicated database.

FIG. 5 is a diagram showing pre-optimized writes to a database based on intelligence gathered from a cache operating on a replicated database. Database requestor 500 submits a database request (read, write, delete, etc.) that is processed and caches 340 (read cache 510, discard cache 520, write cache 530, etc.) corresponding to database 360 are updated accordingly.

Being in a replicated database environment, the changes made to caches 340 are synchronized with caches 540 (read cache 550, discard cache 560, write cache 570, etc.) corresponding to replicated copy of database 580. In this manner, if a second requestor make a database request, such as in 'insert' request to replicated database 580 replicated caches 540 are checked. Because these replicated caches have been synched with caches 340, the process can take advantage of database operations that were performed against database 360.

In the 'insert' example from above, if an entry was already written to database 360, the insert activity would be reflected in both caches 340 and synched caches 540. So, when the second requestor makes an insert request for the same entry against replicated database 580, an error is returned by checking replicated caches 540 without ever accessing replicated database 580. This occurs even though the insert operation was originally performed on database 360 and not on replicated database 580.

Figure 6:
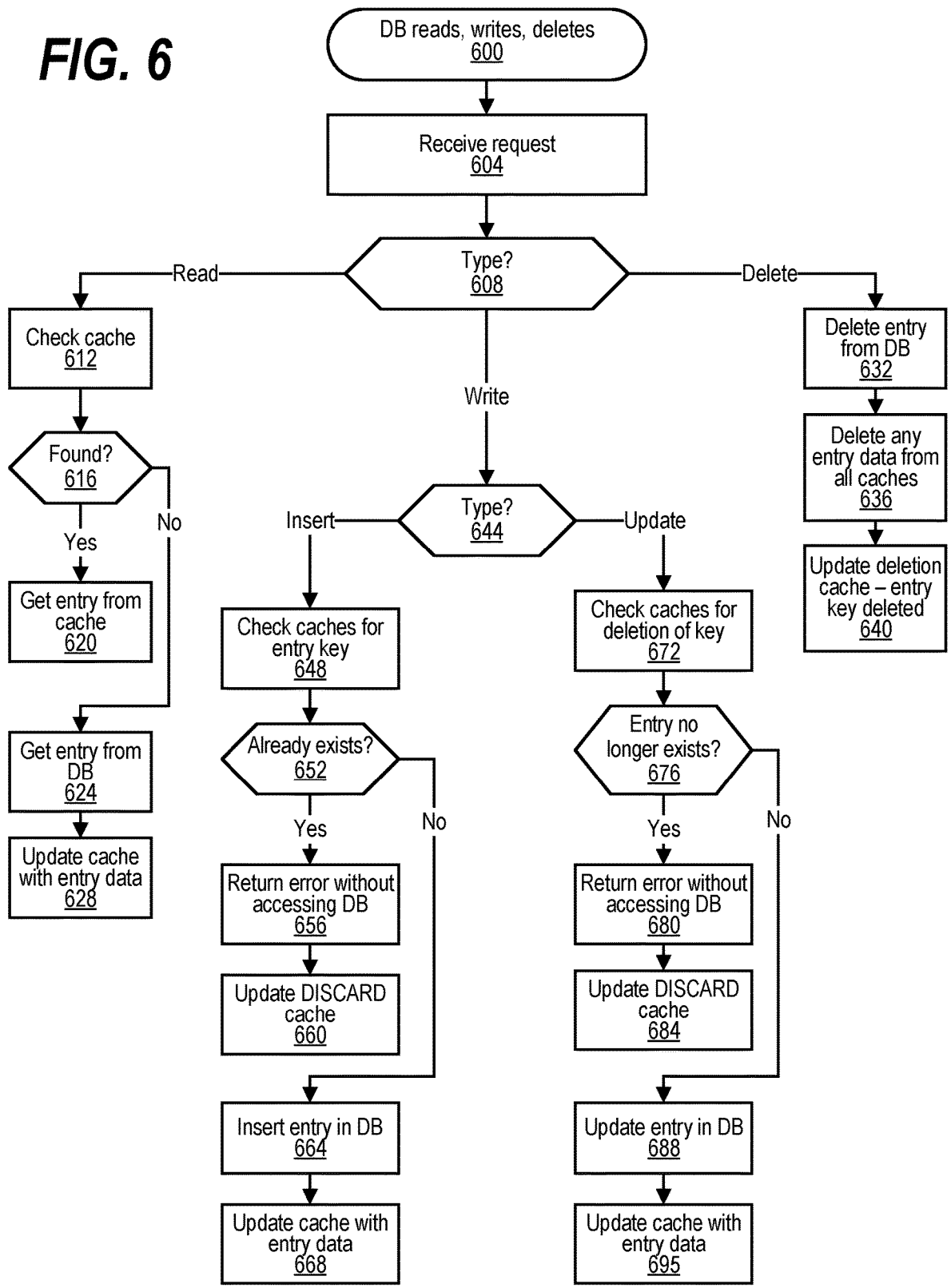
FIG. 6 is a flowchart showing steps taken to process database requests using intelligence gathered from one or more database caches.

FIG. 6 is a flowchart showing steps taken to process database requests using intelligence gathered from one or more database caches. FIG. 6 processing commences at 600 and shows the steps taken by a process that performs optimized database operations including reads, writes, and deletes of data to a database. At step 604, the process receives a request from an entity, such as an application, user, database process, and the like. The process determines what type of operation is being requested (decision 608). The type of operation can be a "read" operation (with processing branching to the "read" branch), a "write" operation (with processing branching to the "write" branch), or a "delete" operation (with processing branching to the "delete" branch).

If the operation is a "read" operation, then decision 608 branches to the "read" branch" to perform steps 612 through 628. At step 612, the process checks the database "read" cache for the entry. The process determines as to whether the entry was found in the "read" cache (decision 616). If the entry was found, then decision 616 branches to the 'yes' branch whereupon, at step 620, the process retrieves the requested entry from the read cache. On the other hand, if the entry was not found in the database read cache, then decision 616 branches to the 'no' branch to perform steps 624 and 628. At step 624, the process retrieves the requested entry from the database and, at step 628, the process updates the database read cache with the entry data so that the data will be available in the read cache the next time the entry is requested.

If the operation is a "delete" operation, then decision 608 branches to the "delete" branch" to perform steps 632 through 640. At step 632, the process deletes the entry from the actual database. At step 636, the process deletes any entry data from database caches (e.g., the database read cache, the database write cache, etc. In one embodiment, at step 640, the process updates a special deletion cache that is used to keep track of entries that have been deleted from the database. In this embodiment, the deletion cache is updated to reflect the fact that the entry has been deleted from the database.

If the operation is a "write" operation, then decision 608 branches to the "write" branch" to perform steps 644 through 695. The process determines what type of write operation is being requested (decision 644). If the write request is an "insert" type of write operation, then decision 644 branches to the 'insert' branch to perform steps 648 through 668. If instead the write request is an "update" type of write operation, then decision 644 branches to the 'update' branch to perform steps 672 through 695.

Steps 648 through 668 are performed for insert type write operations. At step 648, the process checks caches (e.g., the database read cache, etc.) for existence of the entry key already being in the database. Based on the cache, the process determines as to whether the entry already exists in the database making an insertion of the same entry into the database impossible because there would be two entries with the same primary key violating the database integrity rules (decision 652). If the entry already exists in the database, then decision 652 branches to the 'yes' branch to perform steps 656 and 660. On the other hand, if the entry does not already exist in the database, then decision 652 branches to the 'no' branch to perform steps 664 and 668.

Steps 656 and 660 are performed if the entry already exists in the database based on the information found in the caches. At step 656, the process returns an error to the requestor with the error being returned without ever accessing the actual database, only the cache. At step 660, the process updates DISCARD cache. The discard cache is used to record errors made while writing to the database. Because this cache is likely smaller than the read cache, it can be checked before the read cache to identify if an error for the entry has previously occurred.

Steps 664 and 668 are performed if the entry does not already exist in the database. At step 664, the process inserts the entry in the actual database and, at step 668, the process updates one or more caches (e.g., the read cache) with entry data.

Steps 672 through 695 are performed for update type write operations. At step 672, the process checks caches for a previous deletion of a portion (e.g., primary key, etc.) of the entry. The process determines if the entry no longer exists in the database, making an update impossible (decision 676). If the entry no longer exists in the database, then decision 676 branches to the 'yes' branch to perform steps 680 and 684. On the other hand, if the entry does exist in the database, then decision 676 branches to the 'no' branch to perform steps 688 and 695.

Steps 680 and 684 are performed if the entry no longer exists in the database, making an update to the entry impossible. At step 680, the process returns an error to the requestor without ever actually accessing the database. At step 684, the process updates DISCARD cache to reflect the error that occurred during the write operation.

Steps 688 and 695 are performed if the entry exists in the database, making an update to the entry possible. At step 688, the process updates the entry in the actual database. At step 695, the process updates one or more caches (e.g., the database read cache, etc.) with entry data.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. As used herein, a computer readable storage medium does not include a transitory signal.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While particular embodiments have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to others containing only one such element, even when the same claim includes the introductory phrases "one or more" or "at least one" and indefinite articles such as "a" or "an"; the same holds true for the use in the claims of definite articles.

What is claimed is:

1. A computer implemented method, implemented by an information handling system comprising a processor and a memory accessible by the processor, the computer implemented method comprising:
   receiving a request to write an entry to a database;
   checking a plurality of database caches for a portion of the entry, wherein the plurality of database caches includes a database read cache, a database write cache, and a database discard cache;
   in response to the checking and a determination that the entry cannot be written to the database, returning an error without accessing the database and writing an entry pertaining to the request to the database discard cache.

2. The computer implemented method of claim 1 wherein the write request is an insert request and the computer implemented method further comprises:
   checking a database read cache that is included in the one or more database caches;
   returning the error in response to the determination being that the portion of the entry exists in the database read cache; and writing the entry to the database in response to the determination being that the portion of the entry does not exist in the database read cache.

3. The computer implemented method of claim 1 wherein the write request is an update request and the computer implemented method further comprises:
checking a database discard cache that is included in the one or more database caches;
returning the error in response to the determination being that the portion of the entry exists in the database discard cache; and
writing the entry to the database in response to the determination being that the portion of the entry does not exist in the database discard cache.

4. The computer implemented method of claim 1 further comprising:
prior to receiving the request, combining a read cache, a discard cache, and a write cache into an intelligent cache graph builder (ICGB) that includes caching data from each of the read, discard, and write caches, wherein the database cache that is checked is in the ICGB.

5. The computer implemented method of claim 1 further comprising:
in a replicated database environment, synchronizing the one or more database caches corresponding to the database with one or more secondary database caches that each correspond to a replica of the database.

6. The computer implemented method of claim 1 wherein the portion of the entry includes a primary key.

7. An information handling system comprising:
one or more processors;
a memory coupled to at least one of the processors;
a set of computer program instructions stored in the memory and executed by at least one of the processors in order to perform actions comprising:
receiving a request to write an entry to a database;
checking a plurality of database caches for a portion of the entry, wherein the plurality of database caches includes a database read cache, a database write cache, and a database discard cache;
in response to the checking and a determination that the entry cannot be written to the database, returning an error without accessing the database and writing an entry pertaining to the request to the database discard cache.

8. The information handling system of claim 7 wherein the write request is an insert request and the actions further comprise:
checking a database read cache that is included in the one or more database caches;
returning the error in response to the determination being that the portion of the entry exists in the database read cache; and
writing the entry to the database in response to the determination being that the portion of the entry does not exist in the database read cache.

9. The information handling system of claim 7 wherein the write request is an update request and the actions further comprise:
checking a database discard cache that is included in the one or more database caches;
returning the error in response to the determination being that the portion of the entry exists in the database discard cache; and
writing the entry to the database in response to the determination being that the portion of the entry does not exist in the database discard cache.

10. The information handling system of claim 7 wherein the actions further comprise:
prior to receiving the request, combining a read cache, a discard cache, and a write cache into an intelligent cache graph builder (ICGB) that includes caching data from each of the read, discard, and write caches, wherein the database cache that is checked is in the ICGB.

11. The information handling system of claim 7 wherein the actions further comprise:
in a replicated database environment, synchronizing the one or more database caches corresponding to the database with one or more secondary database caches that each correspond to a replica of the database.

12. The information handling system of claim 7 wherein the portion of the entry includes a primary key.

13. A computer program product comprising:
a computer readable storage medium, comprising computer program code that, when executed by an information handling system, executes instructions that perform actions comprising:
receiving a request to write an entry to a database;
checking a plurality of database caches for a portion of the entry, wherein the plurality of database caches includes a database read cache, a database write cache, and a database discard cache;
in response to the checking and a determination that the entry cannot be written to the database, returning an error without accessing the database and writing an entry pertaining to the request to the database discard cache.

14. The computer program product of claim 13 wherein the write request is an insert request and the actions further comprise:
checking a database read cache that is included in the one or more database caches;
returning the error in response to the determination being that the portion of the entry exists in the database read cache; and
writing the entry to the database in response to the determination being that the portion of the entry does not exist in the database read cache.

15. The computer program product of claim 13 wherein the write request is an update request and the actions further comprise:
checking a database discard cache that is included in the one or more database caches;
returning the error in response to the determination being that the portion of the entry exists in the database discard cache; and
writing the entry to the database in response to the determination being that the portion of the entry does not exist in the database discard cache.

16. The computer program product of claim 13 wherein the actions further comprise:
prior to receiving the request, combining a read cache, a discard cache, and a write cache into an intelligent cache graph builder (ICGB) that includes caching data from each of the read, discard, and write caches, wherein the database cache that is checked is in the ICGB.

17. The computer program product of claim 13 wherein the actions further comprise:

in a replicated database environment, synchronizing the one or more database caches corresponding to the database with one or more secondary database caches that each correspond to a replica of the database.

* * * * *